United States Patent
Harigai et al.

(10) Patent No.: US 8,019,152 B2
(45) Date of Patent: Sep. 13, 2011

(54) COLOR CORRECTION DATA ACQUIRING SYSTEM, IMAGE PROCESSING SYSTEM, COLOR CORRECTION DATA ACQUIRING METHOD, IMAGE PROCESSING METHOD, AND PROGRAM

(75) Inventors: Jungo Harigai, Kanagawa (JP); Junichi Ichikawa, Kanagawa (JP); Kenji Ogi, Kanagawa (JP); Shinichi Ohashi, Kanagawa (JP); Kenji Hyoki, Kanagawa (JP)

(73) Assignee: Fuji Xerox Co, Ltd., Tokyo (JP)

( * ) Notice: Subject to any disclaimer, the term of this patent is extended or adjusted under 35 U.S.C. 154(b) by 1361 days.

(21) Appl. No.: 11/347,297

(22) Filed: Feb. 6, 2006

(65) Prior Publication Data
US 2007/0059006 A1    Mar. 15, 2007

(30) Foreign Application Priority Data
Aug. 25, 2005    (JP) ................. 2005-243790

(51) Int. Cl.
*G06K 9/00* (2006.01)
*G06F 3/12* (2006.01)
*G06F 15/00* (2006.01)

(52) U.S. Cl. ......................... 382/167; 358/1.1
(58) Field of Classification Search ............. 358/504, 358/515, 518, 521, 522, 523, 535, 534, 429, 358/455, 1.1; 399/9, 72, 77, 11, 81–82, 87, 399/407, 410, 408; 382/162–167, 318–319
See application file for complete search history.

(56) References Cited

U.S. PATENT DOCUMENTS

| | | | |
|---|---|---|---|
| 6,178,007 B1 * | 1/2001 | Harrington | 358/1.9 |
| 6,229,916 B1 * | 5/2001 | Ohkubo | 382/167 |
| 6,320,668 B1 * | 11/2001 | Kim | 358/1.1 |
| 6,388,768 B2 | 5/2002 | Hada et al. | |
| 6,724,935 B1 * | 4/2004 | Sawada et al. | 382/167 |
| 6,864,995 B2 * | 3/2005 | Nogiwa et al. | 358/1.9 |
| 6,888,646 B1 * | 5/2005 | Sawada et al. | 358/1.9 |
| 7,161,718 B2 * | 1/2007 | Kise | 358/504 |
| 7,177,558 B2 * | 2/2007 | Tanaka et al. | 399/39 |
| 7,453,480 B2 * | 11/2008 | Nishikawa et al. | 347/116 |
| 7,466,450 B2 * | 12/2008 | Matsuzaki | 358/1.9 |

(Continued)

FOREIGN PATENT DOCUMENTS

| | | |
|---|---|---|
| JP | A-7-274194 | 10/1995 |
| JP | A-9-83789 | 3/1997 |
| JP | A 10-13702 | 1/1998 |
| JP | A-10-224651 | 8/1998 |

(Continued)

OTHER PUBLICATIONS

Oct. 28, 2009 Office Action issued in Japanese Patent Application No. 2005-243790 (with English translation).

*Primary Examiner* — Vu Le
*Assistant Examiner* — Andrae S Allison
(74) *Attorney, Agent, or Firm* — Oliff & Berridge, PLC (57) ABSTRACT

A color correction data acquiring system includes: an analysis unit that analyzes a data uniform part in an input image; and an area setting unit that sets a patch data acquiring area based on an analysis result of the analysis unit. The color correction data acquiring system acquires color correction data based on a patch data in the patch data acquiring area of the input image and a patch data in the patch data acquiring area of a read image.

9 Claims, 5 Drawing Sheets

U.S. PATENT DOCUMENTS

| | | | | |
|---|---|---|---|---|
| 7,486,410 B2 * | 2/2009 | Hisamura | ............... | 358/1.12 |
| 7,486,414 B2 * | 2/2009 | Arai | ............... | 358/1.9 |
| 2005/0259185 A1 * | 11/2005 | Kim et al. | ............... | 348/674 |
| 2006/0115177 A1 | 6/2006 | Ishiga | | |

FOREIGN PATENT DOCUMENTS

| | | |
|---|---|---|
| JP | A-2004-222232 | 8/2004 |
| JP | A-2005-210432 | 8/2005 |
| JP | A-2005-217747 | 8/2005 |

* cited by examiner

|    |    |    |
|----|----|----|
| 49 | 50 | 55 |
| 48 | 49 | 52 |
| 49 | 50 | 49 |

VARIANCE $V = (1/(3 \times 3)) \sum (a_i - m)^2$ m: AVERAGE VALUE
$a_i$: TARGET AREA DATA

COLOR CORRECTION DATA ACQUIRING SYSTEM, IMAGE PROCESSING SYSTEM, COLOR CORRECTION DATA ACQUIRING METHOD, IMAGE PROCESSING METHOD, AND PROGRAM

BACKGROUND

1. Technical Field

This invention relates to a color correction data acquiring system of a printer, a facsimile, a copier, etc.

2. Related Art

At present, to perform color correction or color calibration, etc., in a device such as a printer or a display, color patch data is output and data is collected. This is necessary for keeping track of a current machine state to perform color correction. If a large number of types of patch data are acquired, prediction accuracy is improved, but an output cost for patch output, expert knowledge to some extent on color measurement, setting, etc., and the like are required and a burden is placed on the operator; a tradeoff is involved therebetween.

JP-A-10-13702 discloses that batch data is placed in a margin of an output image as calibration data.

However, that is not necessarily accepted by every user because a color patch is output to the output image although it is output to a margin.

SUMMARY

The present invention has been made in view of the above circumstances and provides a color correction data acquiring system, an image processing system, a color correction data acquiring method and a program.

According to an aspect of the present invention, there is provided a color correction data acquiring system including: an analysis unit that analyzes a data uniform part in an input image; and an area setting unit that sets a patch data acquiring area based on an analysis result of the analysis unit; wherein the color correction data acquiring system acquires color correction data based on a patch data in the patch data acquiring area of the input image and a patch data in the patch data acquiring area of a read image.

According to another aspect of the invention, there is provided an image processing system including: an image receiving unit that receives an input image; an analysis unit that analyzes a data uniform part in the input image received by the image receiving unit; an area setting unit that sets a patch data acquiring area based on an analysis result of the analysis unit; a storage unit that stores color correction data acquired based on a patch data in the patch data acquiring area of the input image and a patch data in the patch data acquiring area of a read image; and a color conversion unit that performs color conversion of the input image using the color correction data stored in the storage unit.

According to still another aspect of the invention, there is provided a color correction data acquiring method including: analyzing a data uniform part in an input image; setting a patch data acquiring area based on an analysis result; and acquiring color correction data based on a patch data in the patch data acquiring area of the input image and a patch data in the patch data acquiring area of a read image.

According to yet another aspect of the invention, there is provided an image processing method including: receiving an input image; analyzing a data uniform part in the received input image; setting a patch data acquiring area based on an analysis result; storing color correction data acquired based on a patch data in the patch data acquiring area of the input image and a patch data in the patch data acquiring area of a read image; and performing color conversion of the input image using the stored color correction data.

According to further aspect of the invention, there is provided a storage medium readable by a computer, the storage medium storing a program of instruction executable by the computer to perform a function. The function includes: analyzing a data uniform part in an input image; setting a patch data acquiring area based on an analysis result; and acquiring color correction data based on a patch data in the patch data acquiring area of the input image and a patch data in the patch data acquiring area of a read image.

According to still further aspect of the invention, there is provided a storage medium readable by a computer, the storage medium storing a program of instruction executable by the computer to perform a function. The function includes: receiving an input image; analyzing a data uniform part in the received input image; setting a patch data acquiring area based on an analysis result; storing color correction data acquired based on a patch data in the patch data acquiring area of the input image and a patch data in the patch data acquiring area of a read image; and performing color conversion of the input image using the stored color correction data.

BRIEF DESCRIPTION OF THE DRAWINGS

Embodiments of the present invention will be described in detail based on the following figures, wherein.

DETAILED DESCRIPTION

First, an image forming apparatus 10 according to a first embodiment of the invention will be discussed.

Figure 1:
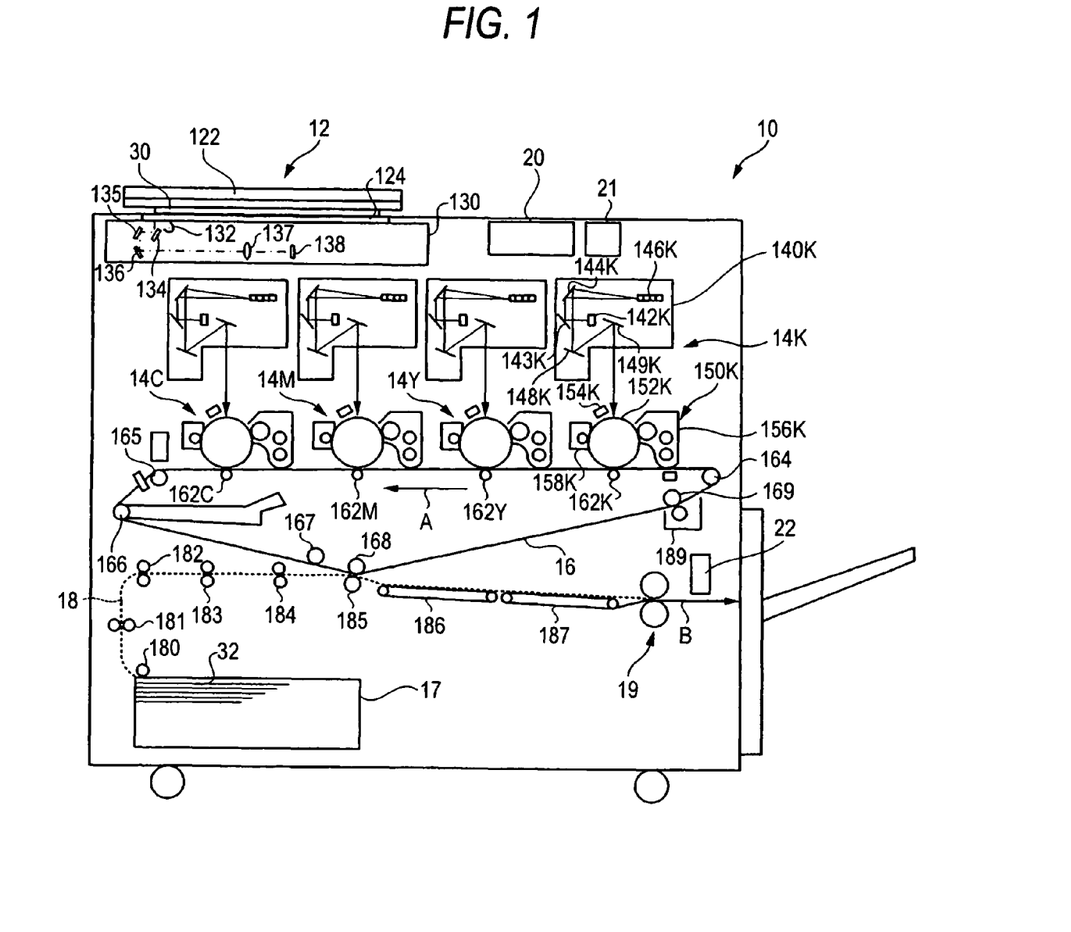
FIG. 1 is a drawing to show the configuration of a tandem image forming apparatus 10 according to an embodiment of the invention.

FIG. 1 is a drawing to show the configuration of the tandem image forming apparatus 10.

As shown in FIG. 1, the image forming apparatus 10 has an image read unit 12, image forming units 14, an intermediate transfer belt 16, a paper tray 17, a paper transport passage 18, a fuser 19, an image processor 20, an image forming controller 21, an a color measurement sensor 22. The image forming apparatus 10 may be a multifunction processing machine including a function of a full-color copier using the image read unit 12 and a function of a facsimile as well as a printer function of printing image data received from a personal computer (not shown), etc.

An outline of the image forming apparatus 10 will be discussed. The image read unit 12, the image processor 20, and the image forming controller 21 are disposed in the upper portion of the image forming apparatus 10. The image read unit 12 reads the image displayed on an original 30 and outputs the image to the image processor 20. The image processor 20 performs image processing such as color conversion processing, color correction processing, (described later) for the image data input from the image read unit 12 or the image data input from the personal computer (not shown), etc., through a network line such as a LAN, and outputs the image data to the image forming controller 21. The image forming controller 21 controls the image forming units 14 based on the image data subjected to the image processing. The image forming controller 21 may be contained in the image processor 20 as a part of the image processor 20.

The image forming units 14 are disposed below the image read unit 12 corresponding to the component colors of a color image. In the example, a first image forming unit 14K, a second image forming unit 14Y, a third image forming unit 14M, and a fourth image forming unit 14C are arranged horizontally with a given spacing from each other along the intermediate transfer belt 16 corresponding to colors of black (K), yellow (Y), magenta (M), and cyan (C). The intermediate transfer belt 16 as an intermediate transfer body turns in the arrow A direction in the figure and the four image forming units 14K, 14Y, 14M, and 14C form color toner images in order based on the image data input from the image processor 20 and transfer the toner images onto the intermediate transfer belt 16 (primary transfer) at the timing at which the toner images are overlapped on each other. The color order of the image forming units 14K, 14Y, 14M, and 14C is not limited to the order of black (K), yellow (Y), magenta (M), and cyan (C) and any order may be adopted like the order of yellow (Y), magenta (M), cyan (C), and black (K), etc.

The paper transport passage 18 is disposed below the intermediate transfer belt 16. A record paper 32 supplied from the paper tray 17 is transported on the paper transport passage 18 and the color toner images multiple-transferred onto the intermediate transfer belt 16 are transferred in batch (secondary transfer) and the transferred toner image is fixed by the fuser 19 and is ejected to the outside along the arrow B.

Next, the components of the image forming apparatus 10 will be discussed in more detail.

As shown in FIG. 1, the image read unit 12 has platen glass 124 on which an original 30 is placed, a platen cover 122 for pressing the original 30 against the top of the platen glass 124, and an image reader 130 for reading the image of the original 30 placed on the platen glass 124. The image reader 130 is configured so that the original 30 placed on the platen glass 124 is illuminated by a light source 132, and the reflected light image from the original 30 is scanned and exposed onto an image read device 138 of CCD, etc., through a reduction optical system made up of a full rate mirror 134, a first half rate mirror 135, a second half rate mirror 136, and an image forming lens 137, and reads the color material reflected light image of the original 30 by the image read device 138 at a predetermined dot density (for example, 16 dots/mm).

The image processor 20 performs predetermined image processing of color conversion, etc., for the image data read by the image read unit 12 or the image data input through the network line. The color material reflected light image of the original 30 read by the image read unit 12 is three-color original reflectance data of red (R), green (G), and blue (B), for example, and is converted into four-color original color material gray level data of yellow (Y), magenta (M), cyan (C), and black (K) by image processing of the image processor 20.

The image forming controller 21 generates a pulse signal in response to the image data input from the image processor 20 (YMCK) and outputs the pulse signal to light scanners 140. More specifically, the image forming controller 21 outputs the pulse signal to a first light scanner 140K, a second light scanner 140Y, a third light scanner 140M, and a fourth light scanner 140C (described later) based on the image data to form an image.

The first image forming unit 14K, the second image forming unit 14Y, the third image forming unit 14M, and the fourth image forming unit 14C are arranged in parallel with a given spacing from each other in the horizontal direction and are almost the same in configuration except that they differ in color of the image to be formed. Therefore, the first image forming unit 14K will be discussed as a representative. The first to fourth image forming units 14 are distinguished from each other with K, Y, M, or C added thereto.

The image forming unit 14K has the light scanner 140K for scanning a laser beam in response to the image data input from the image processor 20 and an image forming device 150K for forming an electrostatic latent image according to the laser beam scanned by the light scanner 140K.

The light scanner 140K modulates a semiconductor laser 142K in response to black (K) image data and emits a laser beam LB (K) from the semiconductor laser 142K in response to the image data. The laser beam LB (K) emitted from the semiconductor laser 142K is applied through a first reflecting mirror 143K and a second reflecting mirror 144K to a rotating polygon mirror 146K and is deflectively scanned by the rotating polygon mirror 146K and is applied through the second reflecting mirror 144K, a third reflecting mirror 148K, and a fourth reflecting mirror 149K onto a photoconductive drum 152K of the image forming device 150K.

The image forming device 150K is made up of the photoconductive drum 152K as an image support rotating at a predetermined rotation speed along the arrow A direction, a scorotron 154K for primary charging as charging means for uniformly charging the surface of the photoconductive drum 152K, a developing device 156K for developing the electrostatic latent image formed on the photoconductive drum 152K, and a cleaning device 158K. The photoconductive drum 152K is uniformly charged by the scorotron 154K and has an electrostatic latent image formed according to the laser beam LB (K) applied by the light scanner 140K. The electrostatic latent image formed on the photoconductive drum 152K is developed in black (K) toner by the developing device 156K and the toner image is transferred onto the intermediate transfer belt 16. After the toner image transfer process, the remaining toner, paper dust, and the like deposited on the photoconductive drum 152K are removed by the cleaning device 158K.

Other image forming units 14Y, 14M, and 14C also form color toner images of yellow (Y), magenta (M), and cyan (C) and transfer the formed toner images onto the intermediate transfer belt 16 in a similar manner to that described above.

The intermediate transfer belt 16 is placed on a drive roll 164, a first idle roll 165, a steering roll 166, a second idle roll 167, a backup roll 168, and a third idle roll 169 under a given tension. As the drive roll 164 is rotated by a drive motor (not shown), the intermediate transfer belt 16 is circulated at a predetermined speed in the arrow A direction. The intermediate transfer belt 16 is formed like an endless belt by forming a synthetic resin film of polyimide, etc., having flexibility like a belt and connecting both ends of the synthetic resin film formed like a belt by welding, etc.

On the intermediate transfer belt 16, a first primary transfer roll 162K, a second primary transfer roll 162Y, a third primary transfer roll 162M, and a fourth primary transfer roll 162C are disposed at the positions opposed to the image forming units 14K, 14Y, 14M, and 14C respectively, and the color toner images formed on the photoconductive drums 152K, 152Y, 152M, and 152C are multiple-transferred onto the intermediate transfer belt 16 by the primary transfer rolls 162. The remaining toner deposited on the intermediate transfer belt 16 is removed by a cleaning blade or a cleaning brush of a belt cleaning device 189 provided downstream from a secondary transfer position.

Disposed in the paper transport passage 18 are a paper feed roller 180 for taking out record paper 32 from the paper tray 17, a first roller pair 181, a second roller pair 182, and a third roller pair 183 for transporting paper, and a registration roll 184 for transporting the record paper 32 to the secondary transfer position at the predetermined timing.

A secondary transfer roll 185 for being pressed against the backup roll 168 is disposed at the secondary transfer position on the paper transport passage 18, and the color toner images multiple-transferred onto the intermediate transfer belt 16 are secondarily transferred onto the record paper 32 by the pressing force of the secondary transfer roll 185 and an electrostatic force. The record paper 32 onto which the color toner images are transferred is transported to the fuser 19 by a first transport belt 186 and a second transport belt 187.

The fuser 19 performs heating processing and pressurization processing for the record paper 32 onto which the color toner images are transferred, thereby fusing the toner into the record paper 32.

The color measurement sensor 22 is provided in the paper transport passage 18. The color measurement sensor 22 reads an image from the record paper 32 transported on the paper transport passage 18 and measures the feature amount of the image. The feature amount measured by the color measurement sensor 22 is color data of the density, the saturation, the tint, the color distribution, etc., of each color, for example.

The color measurement sensor 22 outputs the data relevant to the read image to the image processor 20. The color measurement sensor 22 may read the image portion only in the area specified from the image processor 20 as described later.

Figure 2:
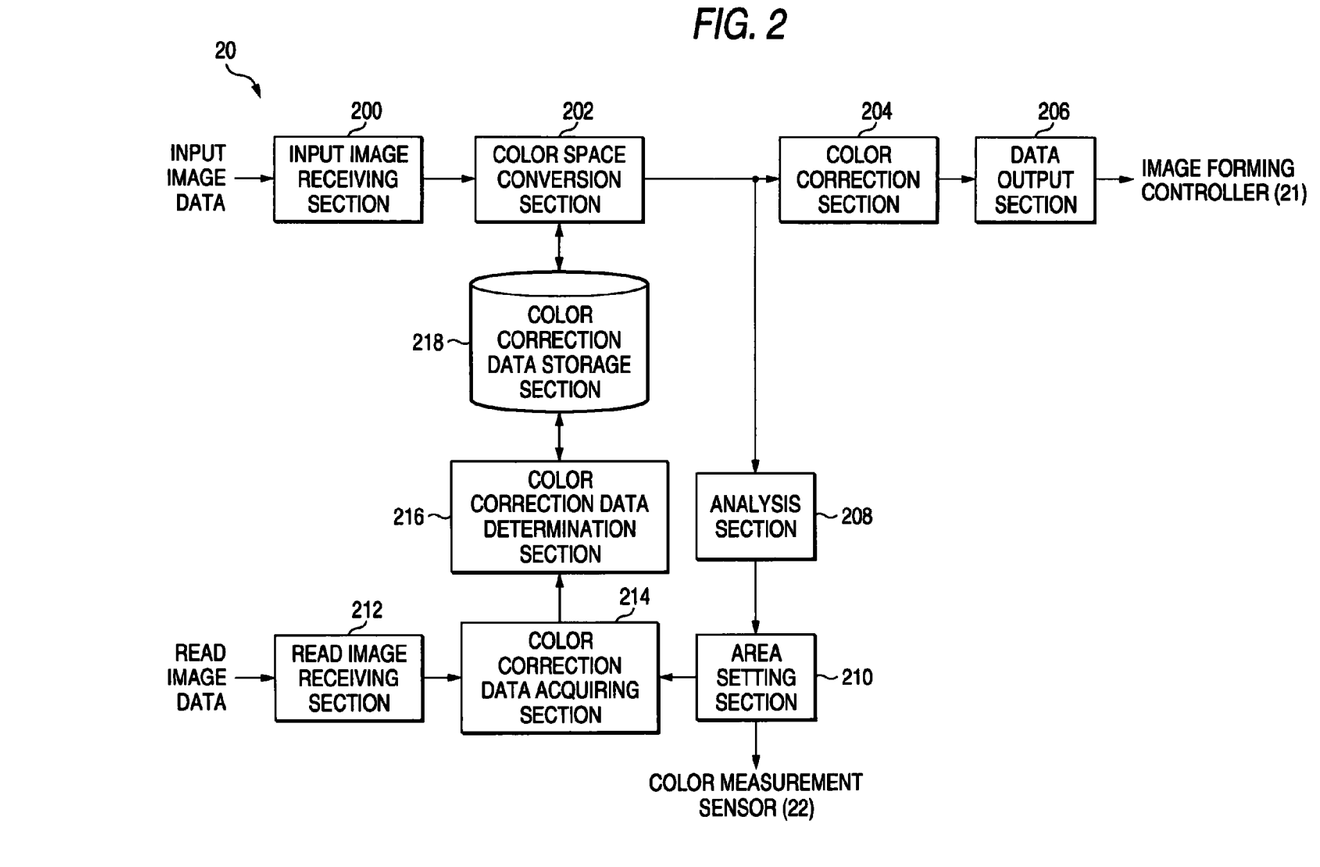
FIG. 2 is a block diagram to show the functional configuration of an image processor 20 according to a first embodiment of the invention.

FIG. 2 is a block diagram to show the functional configuration of the image processor 20.

As shown in FIG. 2, the image processor 20 has an input image receiving section 200, a color space conversion section 202, a color correction section 204, a data output section 206, an analysis section 208, an area setting section 210, a read image receiving section 212, a color correction data acquiring section 214, a color correction data determination section 216, and a color correction data storage section 218.

The components contained in the image processor 20 may be implemented as software by a CPU, memory, a program, etc., or may be implemented as hardware by an ASIC, etc. The image processor 20 may be contained not only in the image forming apparatus 10, but also in a personal computer, etc., for example.

In the image processor 20, the input image receiving section 200 receives an input image from the image read unit 12 shown in FIG. 1 or a personal computer of a user, and outputs the image to the color space conversion section 202. The input image data is represented in eight bits of each of R, G, and B and is image data belonging to sRGB space.

The color space conversion section 202 converts the input image (RGB) into a CIELAB (L*, a*, b*) color space (or CIEXYZ) of color measurement value using color correction data stored in the color correction data storage section 218 described later. The color space conversion section 202 converts the image data in the provided CIELAB color space into image data in a YMCK color space of a color system suited for print processing using the color correction data stored in the color correction data storage section 218, and outputs the image data to the color correction section 204. Here, the color correction data is used as informing indicating the color reproduction characteristic of the image. The color space conversion section 202 outputs the input image represented in at least one of the RGB color space and the YMCK color space to the analysis section 208.

The color correction section 204 corrects the input image data to the gray level suited to print processing and outputs the image data to the data output section 206. The color correction section 204 may perform color correction processing using the color correction data stored in the color correction data storage section 218.

The data output section 206 outputs the image data in the YMCK color space input from the color correction section 204 to the image forming controller 21. The data output section 206 may output the input image data to memory to store image data.

The analysis section 208 analyzes a data uniform part in the input image from the color space conversion section 202. More specifically, the analysis section 208 analyzes the input image in a frequency domain, generates a difference image that represents a difference between the input image and the low-frequency image provided by removing the high-frequency component from the input image, and determines the low-frequency portion (namely, smooth image portion). The analysis section 208 outputs the image in the determined low-frequency portion to the area setting section 210. The processing of the analysis section 208 in the frequency domain is described later in detail.

The area setting section 210 sets the area in which patch data is acquired based on the data uniform part in the input image from the analysis section 208 and outputs the image in the setup area (for example, at least either of the RGB color space and the YMCK color space) to the color correction data acquiring section 214. The area setting section 210 adopts the image portion in a predetermined area or more in the image of the data uniform part in the input image as the patch data acquiring area. The area setting section 210 sets a threshold value, determines whether or not the image portion is larger than the threshold value, and determines whether or not to adopt the image portion as the patch data acquiring area.

The area setting section 210 may specify the patch data acquiring area for the color measurement sensor 22. In this case, the color measurement sensor 22 reads the image portion only in the area specified by the area setting section 210 and outputs the read image portion to the image processor 20.

The read image receiving section 212 receives the read image data input from the color measurement sensor 22 and outputs the image data to the color correction data acquiring section 214. The read image receiving section 212 may output the feature amount of the whole read image to the color correction data acquiring section 214 or may output the data only of the image portion in the patch data acquiring area. The read image data is represented in a device-independent color space, such as the CIELAB color space or the CIEXYZ color space.

The read image receiving section 212 may receive not only the read image data input from the color measurement sensor 22, but also read image data provided by an external scanner (not shown).

The color correction data acquiring section 214 acquires color correction data based on the image portion in the patch data acquiring area (patch data) in the input image from the area setting section 210 and the batch data in the area in the read image input from the read image receiving section 212. The color correction data is generated in a pair of the patch data of the input image and the patch data of the read image. The color correction data may be generated in a pair of a device-dependent color space and a device-independent color space; for example, it is generated in a pair of data in the YMCK color space and data in the CIELAB color space. The color correction data acquiring section 214 outputs the acquired data pair to the color correction data determination section 216.

The color correction data determination section 216 determines whether or not the color correction data input from the color correction data acquiring section 214 is appropriate. More specifically, the color correction data determination section 216 makes a comparison between the color correction data and the color correction data stored in the color correction data storage section 218 and used by the color space conversion section 202. If the already stored color correction data is more appropriate, the color correction data determination section 216 deletes the acquired color correction data; if the acquired color correction data is more appropriate, the color correction data determination section 216 newly stores the acquired color correction data in the color correction data storage section 218.

The color correction data storage section 218 stores the color correction data determined by the color correction data determination section 216. The color correction data storage section 218 also stores previously acquired color correction data. The color correction data storage section 218 is implemented as a record unit such as an HDD (not shown) or memory. The color correction data is used as a profile, for example, for color conversion processing of the color space conversion section 202 (for example, from the CIELAB color space to the YMCK color space).

The data as a pair of the patch data of the input image (for example, data in the YMCK color space) and the patch data of the read image (for example, data in the CIELAB color space) is also used for color correction, color uniformity correction, and process control. The data pair is not limited to the profile format and may be used in a data format suited to color uniformity correction, etc.

Figure 3:
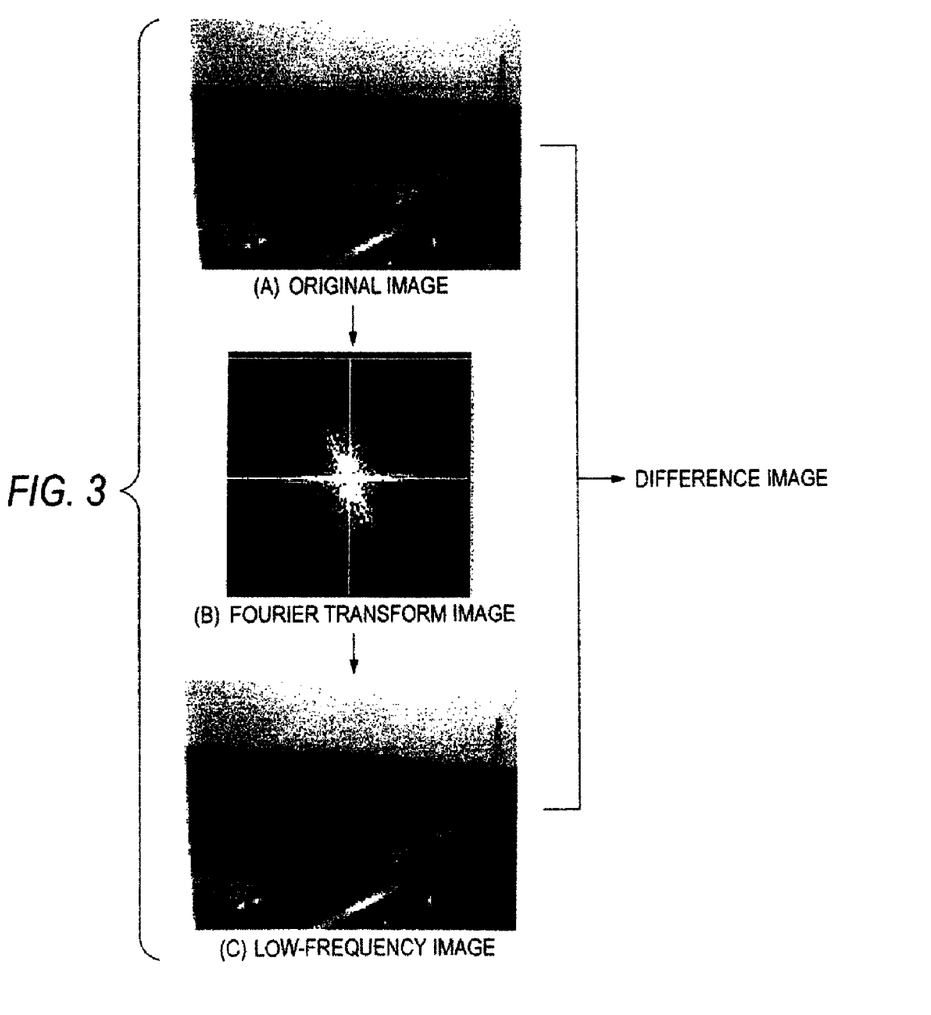
FIG. 3 is a drawing to describe analysis processing in the image processor 20 according to the first embodiment; (A) illustrates an original image, (B) illustrates an image obtained by performing Fourier transform of the original image, and (C) illustrates a low-frequency image obtained by removing a high-frequency component from the original image.

FIG. 3 is a drawing to describe spatial frequency processing of the analysis section 208; (A) illustrates an original image, (B) illustrates an image obtained by performing Fourier transform of the original image, and (C) illustrates a low-frequency image obtained by removing a high-frequency component from the original image.

As illustrated in FIG. 3, the analysis section 208 obtains the Fourier transform image (FIG. 3, (B)) of the original image (FIG. 3, (A)) and obtains the low-frequency image with a high-frequency band cut through low-pass filtering (FIG. 3, (C)). Next, the analysis section 208 generates a difference image that represents a difference between the original image and the low-frequency image. The analysis section 208 outputs the area in which the difference is equal to or less than a predetermined threshold value to the area setting section 210 as an image candidate area.

The area setting section 210 sets the image portion equal to or larger than a predetermined area in the image candidate area as the patch data acquiring area. In FIG. 3, (A), for example, the sky portion is adopted as the patch data acquiring area and blue patch data is acquired.

The analysis section 208 may create a high-frequency image with a low-frequency band cut through high-pass filtering rather than low-pass filtering and may analyze the data uniform part in the original image based on the difference data between the original image and the high-frequency image.

Figure 4:
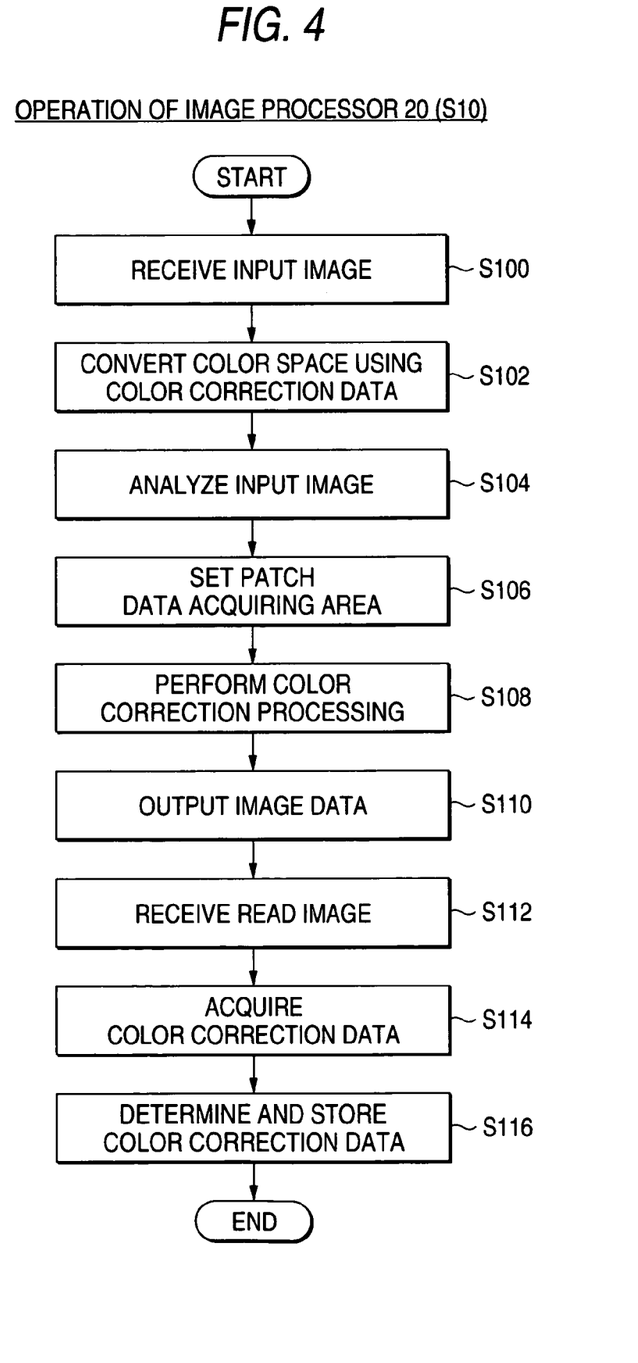
FIG. 4 is a flowchart to show the operation of the image processor 20 (S10) containing processing of acquiring color correction data.

FIG. 4 is a flowchart to show the operation of the image processor 20 (S10) containing processing of acquiring color correction data.

As shown in FIG. 4, at step 100 (S100), the user makes a print request through a personal computer or the image read unit 12. When input image data is input, the input image receiving section 200 acquires the input image data through the network or the image read unit 12 and outputs the received image data (for example, R, G, and B each eight bits) to the color space conversion section 202.

At step 102 (S102), the color space conversion section 202 first performs color conversion of the input image data in the RGB color space to data in the CIELAB color space and performs predetermined image processing using the color correction data stored in the color correction data storage section 218. Next, the color space conversion section 202 performs color conversion of the provided data in the CIELAB color space to image data in the YMCK color space dependent on the output device using the color correction data and outputs the image data to the color correction section 204.

At step 104 (S104), the analysis section 208 analyzes the input image represented in at least either of the RGB color space and the YMCK color space input from the color space conversion section 202, and determines the data uniform part in the image. Specifically, the analysis section 208 cuts the high-frequency component in the frequency domain about the input image to generate a low-frequency image, and analyzes the data uniform part in the input image based on a difference image that represents a difference between the input image and the generated low-frequency image.

At step 106 (S106), the area setting section 210 sets the image portion equal to or larger than the predetermined area in the image portion of the input image from the analysis section 208 as the patch data acquiring area. The area setting section 210 outputs the setup patch data acquiring area to the color correction data acquiring section 214. The area setting section 210 may instruct the color measurement sensor 22 to measure the color of the portion only.

At step 108 (S108), the color correction section 204 performs predetermined correction processing of gray level, density, etc., for the image data input from the color space conversion section 202, and outputs the image data to the data output section 206.

At step 110 (S110), the data output section 206 outputs the image data input from the color correction section 204 to the image forming controller 21. The image forming controller 21 controls the image forming units 14 based on the image data to form an image on record paper.

At step 112 (S112), the color measurement sensor 22 reads the image from the record paper 32 transported over the paper transport passage 18 and outputs the read image data to the image processor 20. The color measurement sensor 22 may read the whole of the record paper 32 or if the patch data acquiring area is specified by the area setting section 210, the color measurement sensor 22 may read the image portion only in the patch data acquiring area.

In the image processor 20, the read image receiving section 212 receives the read image data input from the color measurement sensor 22 and outputs the image data to the color correction data acquiring section 214. If the read image receiving section 212 receives the read image data of the whole of the record paper 32, it may output the data only of the image portion in the patch data acquiring area.

At step 114 (S114), the color correction data acquiring section 214 generates the color correction data based on the image portion in the patch data acquiring area in the input image (for example, YMCK data) and the image portion in the patch data acquiring area in the read image input from the read image receiving section 212 (for example, CIELAB data). The color correction data acquiring section 214 outputs the generated color correction data to the color correction data determination section 216.

At step 116 (S116), the color correction data determination section 216 determines whether or not the generated color correction data is appropriate for use for color conversion processing, color correction processing, etc. If the generated color correction data is appropriate, the color correction data determination section 216 stores the color correction data in the color correction data storage section 218; otherwise, the color correction data determination section 216 holds the color correction data already stored in the color correction data storage section 218.

As described above, the color correction data can be acquired by the image processor 20. Particularly, color correction data acquiring system analyzes the data uniform part in the input image, sets the area in which patch data is acquired based on the analysis result, and acquires color correction data based on the patch data in the setup area in the input image and the patch data in the area in the read image, and thus can search any image output by the user for the area that can be used as calibration data and can collect the informing required for calibration out of the area.

The color correction data thus acquired is used for color conversion processing, calibration, etc., so that the cost and the labor taken for machine calibration can be reduced. Further, the color correction data acquiring system according to the invention acquires the color correction data out of the image output by the user, so that the color correction data more suited to the user can be acquired and machine calibration with higher accuracy can be conducted.

Next, an image processor 20 according to a second embodiment of the invention will be discussed.

Figure 5:
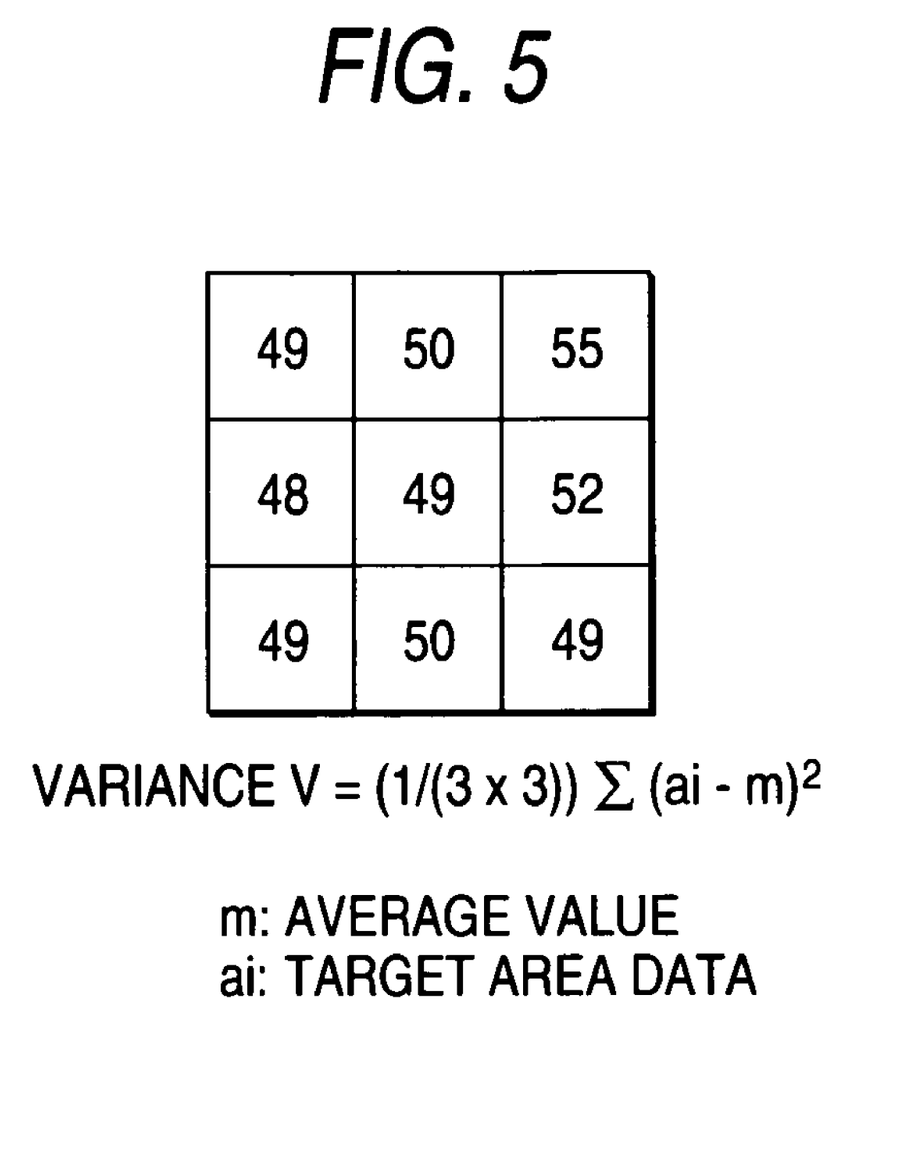
FIG. 5 is a drawing to describe analysis processing in an image processor 20 according to a second embodiment of the invention.

FIG. 5 is a drawing to describe analysis processing in the image processor 20 according to the embodiment.

As shown in FIG. 5, the image processor 20 according to the embodiment differs from that in the first embodiment in that it analyzes the data uniform part in an input image by performing real space processing. More specifically, in the image processor 20, an analysis section 208 analyzes the input image in a time domain, obtains the variance of pixel values in a peripheral area of an attention pixel, and determines the data uniform part in the input image.

The analysis section 208 analyzes the data in the proximity of the periphery of the attention pixel in the input image (in printing, coverage). The analysis section 208 obtains the variance using a matrix of 3×3 pixels, for example. The variance V can be obtained according to the following expression:

$$V=(1/(3\times 3))\Sigma(ai-m)^2$$

where m is the average value of the pixel values and ai is the pixel value of the target pixel. The analyzed area is not limited to the area of 3×3 pixels and may be changed in response to the input image.

The analysis section 208 sets a predetermined threshold value and if the variance V is equal to or less than the threshold value, the analysis section 208 outputs the pixel to an area setting section 210 as the data uniform part.

The analysis section 208 may use the whole image as the data in the proximity of the periphery. In this case, the acquired patch data is coverage data in the data acquiring area.

As described above, the image processor 20 obtains the variance of the pixel values in the peripheral area of the attention pixel and analyzes the data uniform part in the input image, so that the area that can be used as the calibration data can be determined out of any image output by the user.

According to the embodiments of the invention, the analysis means may analyze the image in a frequency domain.

According to the embodiments of the invention, the analysis means may generate a difference image that represents a difference between the input image and a low-frequency image obtained by removing a high-frequency component from the input image.

According to the embodiments of the invention, the area setting means may set an area where the pixel value difference is equal to or less than a predetermined value in the difference image generated by the analysis means as the patch data acquiring area.

According to the embodiments of the invention, the analysis means may analyze the image in a time domain.

According to the embodiments of the invention, the analysis means may obtain the variance of pixels contained in the peripheral area of an attention pixel.

According to the embodiments of the invention, the area setting means may set an area where the variance obtained by the analysis means is equal to or less than a predetermined value as the patch data acquiring area.

According to the embodiment of the invention, the area setting means may set an area equal to larger than a predetermined area as the patch data acquiring area.

In the embodiment of the invention, the color correction data acquiring system may further includes color correction data storage means that stores the acquired color correction data.

According to the embodiments of the invention, the color correction data may include device-dependent data and device-independent data.

According to the embodiments of the invention, the color correction data may include data for color correction.

According to the embodiments of the invention, the color correction data may include data for color uniformity correction.

According to the embodiments of the invention, the color correction data may include data for process control.

According to the embodiments of the invention, the color correction data acquiring system may further include determination means that determines whether the acquired color correction data is appropriate or not.

According to the embodiments of the invention, an area from which data used for color correction data is acquired can be searched from any image output by a user. And information which needs to color correction can be acquired.

The entire disclosure of Japanese Patent Application No. 2005-243790 filed on Aug. 25, 2005 including specification, claims, drawings and abstract is incorporated herein be reference in its entirety.

What is claimed is:

1. A color correction data acquiring system comprising:
an analysis unit that generates a difference image representing a difference between an input image that is to be recorded on a recording medium and a low-frequency image obtained by removing a high-frequency component from the input image in a frequency domain; and
an area setting unit that sets an area where a pixel value difference is equal to or less than a predetermined value in the difference image,
wherein the color correction data acquiring system acquires color correction data based on a pair of the area of difference image and an image portion of a read image corresponding to the area, and
the read image is an electronic image that is generated by reading the recording medium on which the input image is recorded.

2. The color correction data acquiring system according to claim 1, further comprising:
a color correction data storage unit that stores the acquired color correction data.

3. The color correction data acquiring system according to claim 1,
wherein the color correction data includes device-dependent data and device-independent data.

4. The color correction data acquiring system according to claim 1,
wherein the color correction data includes data for color calibration.

5. The color correction data acquiring system according to claim 1,
wherein the color correction data includes data for color uniformity correction.

6. The color correction data acquiring system according to claim 1,
wherein the color correction data includes data for process control.

7. The color correction data acquiring system according to claim 1, further comprising:
a determination unit that determines whether the color correction data is appropriate or not.

8. A color correction data acquiring method comprising:
generating a difference image representing a difference between an input image that is to be recorded on a recording medium and a low-frequency image obtained by removing a high-frequency component from the input image in a frequency domain;
setting an area where a pixel value difference is equal to or less than a predetermined value in the difference image, and
acquiring color correction data based on a pair of the area of difference image and an image portion of a read image corresponding to the area, and
wherein the read image is an electronic image that is generated by reading the recording medium on which the input image is recorded.

9. A non-transitory computer readable storage medium storing a computer program of instructions executable by a computer to perform a function, the function comprising:
generating a difference image representing a difference between an input image that is to be recorded on a recording medium and a low-frequency image obtained by removing a high-frequency component from the input image in a frequency domain;
setting an area where a pixel value difference is equal to or less than a predetermined value in the difference image,
acquiring color correction data based on a pair of the area of difference image and an image portion of a read image corresponding to the area, and
wherein the read image is an electronic image that is generated by reading the recording medium on which the input image is recorded.

\* \* \* \* \*